United States Patent [19]
Kobayashi

[11] Patent Number: 4,953,957
[45] Date of Patent: * Sep. 4, 1990

[54] ZOOM LENS SYSTEM

[75] Inventor: Yuko Kobayashi, Tokyo, Japan

[73] Assignee: Olympus Optical Co., Ltd., Tokyo, Japan

[*] Notice: The portion of the term of this patent subsequent to May 16, 2006 has been disclaimed.

[21] Appl. No.: 326,633

[22] Filed: Mar. 21, 1989

[30] Foreign Application Priority Data

Mar. 24, 1988 [JP] Japan .................. 63-70730

[51] Int. Cl.$^5$ .................. G02B 15/14; G02B 9/58
[52] U.S. Cl. .................. 350/423; 350/413
[58] Field of Search .................. 350/423, 427, 413

[56] References Cited

U.S. PATENT DOCUMENTS 4,830,476 5/1989 Aoki .................. 350/427

FOREIGN PATENT DOCUMENTS 3611590 10/1986 Japan .................. 350/423
62-153909 7/1987 Japan .

Primary Examiner—Bruce Y. Arnold
Assistant Examiner—Rebecca D. Gass
Attorney, Agent, or Firm—Cushman, Darby & Cushman

[57] ABSTRACT

A zoom lens system comprising a very small number of lens components, having favorably corrected aberrations, comprising two lens groups having positive refractive power and negative refractive power respectively, and so adapted as to perform variation of focal length by varying the airspace reserved between the two lens groups, said lens group having positive refractive power comprising at least one graded refractive index lens component having the shape of a negative meniscus lens and a refractive power distribution wherein refractive indices are lowered as the lens portions are farther from the optical axis in the direction perpendicular to the optical axis.

6 Claims, 4 Drawing Sheets

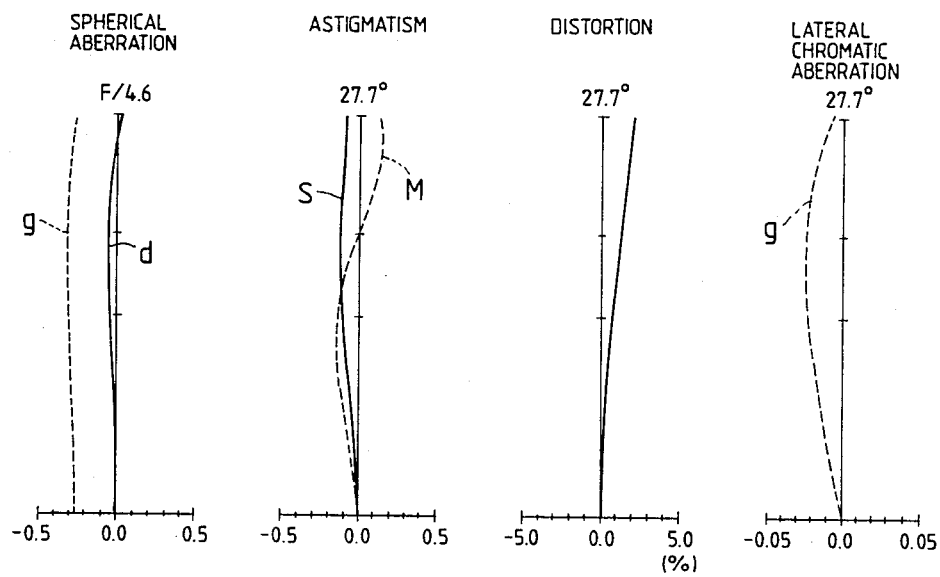
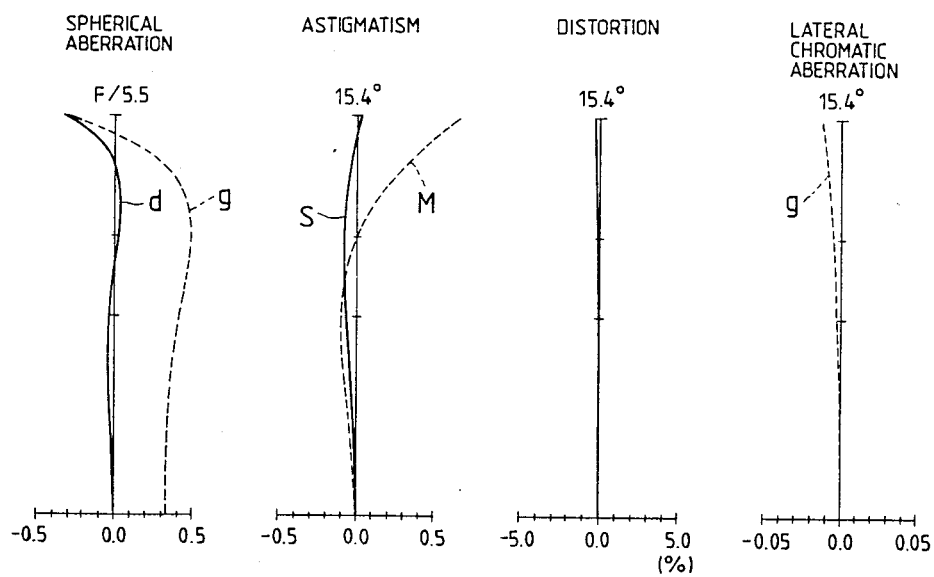

ZOOM LENS SYSTEM

BACKGROUND OF THE INVENTION (a) Field of the invention:

The present invention relates to a zoom lens system, and more specifically to a zoom lens system consisting of two lens groups for use in compact cameras, single lens reflex cameras and so on.

(b) Description of the prior art:

In the recent years, the progress made in the manufacturing techniques for lenses has made it possible to fabricate lens systems at low cost. This is mainly owing to the reduction of manufacturing cost for lenses realized by the progresses in shaping techniques of plastic lenses and aspherical surfaces.

Further, use of aspherical lenses is now bringing about possibilities to enhance performance of lens systems and reduce numbers of lens components. In order to correct curvature of field favorably in lens systems, it is necessary to minimize Petzval's sums of the lens systems. However, aspherical lenses have no function to correct Petzval's sum. It is therefore impossible to correct curvature of field favorably by using aspherical lenses in lens systems and number of lens components must be increased to correct curvature of field. Accordingly, numbers of lens components have not been reduced sufficiently yet in lens systems.

Furthermore, the zoom lens systems consisting of two lens groups having positive refractive power and negative refractive power respectively, and so adapted as to perform variation of focal length by varying the airspace reserved between these lens groups have a common defect that remarkable distortion is produced by the lens group having the negative refractive power. In case of a zoom lens system consisting of a positive front lens group and a negative rear lens group, for example, remarkable positive distortion is produced at the wide position by the rear lens group having the negative refractive power. In the case of a zoom lens system consisting of a front lens group having negative refractive power and a rear lens group having positive refractive power, on the other hand, remarkable negative distortion is produced at the wide position by the front lens group having the negative refractive power.

In order to correct this distortion, it is necessary to cancel said distortion by producing distortion by the positive lens group so as to minimize the distortion in the lens system as a whole. For this purpose, a surface having a diverging function must be arranged in the lens group having the converging function, and spherical aberration and curvature of field must also be corrected at the same time, thereby inevitably marking it necessary to increase number of lens components constituting the lens group having the positive refractive power.

In order to provide a lens system manufacturable at a low cost, it is necessary to simplify composition of the lens system or reduce number of the lens components thereof and, in addition, correct the aberrations as described above. For this purpose, new technical means must be adopted for lens design. Attention is attracted as this means to use of graded refractive index lenses (hereinafter abbreviated as GRIN lenses). The GRIN lenses are classified into so-called axial GRIN lenses whose refractive indices are varied in the direction along the optical axis and so-called radial GRIN lenses having refractive indices varying in the direction perpendicular to the optical axis. Out of these two types, the radial GRIN lenses are effective for correcting Petzval's sum and used in photographing lens systems. As a photographing lens system using the radial GRIN lens, there is known the lens system disclosed by Japanese Unexamined Published patent application No. 153909/62. However, the lens system disclosed by this patent comprises five or more lens components, and is insufficient in compactness and lightness in weight.

SUMMARY OF THE INVENTION

A primary object of the present invention is to provide a very compact zoom lens system comprizing two lens groups having positive refractive power and negative refractive power respectively, so adapted as to perform variation of focal length by varying the airspace reserved between these lens groups, having favorably corrected aberrations and comprising a small number of lens components.

The zoom lens system according to the present invention comprising two lens groups as described above and comprises at least one GRIN lens component arranged in the lens group having positive refractive power. This GRIN lens component has the shape of a negative meniscus lens and is designed for a refractive index distribution wherein refractive indices are lowered as the lens portions are farther from the optical axis as expressed by the following formula:

$$n(y)_d = N_{2d} + N_{1d}y^2 + N_{2d}y^4 + \ldots$$

wherein the reference symbol y represents distance from the optical axis in the direction perpendicular to the optical axis, the reference symbol $n(y)_d$ designates refractive index for the d-line at a point located at a distance of y from the optical axis, the reference symbol $N_{0d}$ denotes refractive index for the d-line on the optical axis, and the reference symbols $N_{1d}, N_{2d}, \ldots$ represent the coefficients of the second order, the fourth order, ... of refractive index distribution.

Further, said GRIN lens component is so designed as to satisfy the following condition (1):

$$-12 < N_{1d}f_W^2 < -0.5 \qquad (1)$$

wherein the reference symbol $f_W$ represents focal length of the zoom lens system as a whole at the wide position thereof.

When the lens group having the positive refractive power, out of the two lens groups, is arranged on the object side in the zoom lens system according to the present invention, i.e., when the zoom lens system comprises a positive lens group and a negative lens group arranged in the order from the object side, it is preferable to arrange the GRIN lens component having the shape of a negative meniscus lens in such a direction as to locate the convex surface thereof on the object side and design it so as to satisfy the following condition (2):

$$1 < R_1/R_2 < 6 \qquad (2)$$

wherein the reference symbols $R_1$ and $R_2$ represent radii of curvature on the object side surface and the image side surface of said GRIN lens component.

When the lens group having the negative refractive power is arranged on the image side, i.e., in case of a zoom lens system comprising a negative lens group and a positive lens group arranged in the order from the object side, it is preferable to arrange said lens group having the shape of a negative meniscus lens in such a direction as to locate the convex surface thereof on the image side and design it so as to satisfy the following condition (3):

$$1 < R_2/R_1 < 6 \quad (3)$$

The GRIN lens component described above has a function to correct Petzval's sum.

When refractive power of lens surface is represented by $\phi$ and refractive index is designated by n, the factor having relation to Petzval's sum of a homogeneous lens (Petzval factor) is expressed as $\phi/n$.

Further, when the refractive power of a medium is represented by $\phi_G$ and refractive index of a lens on the optical axis is designated by $N_0$, the Petzval factor of a GRIN lens component is expressed as $\phi/N_0 + \phi_G/N_0^2$. That is to say, the Petzval factor of a GRIN lens component is dependent on both lens surface an medium.

The present invention minimizes the Petzval's sum produced by the positive lens group by effectively utilizing the Petzval's sum depending on medium of a GRIN lens component. Speaking more concretely, the present invention uses, in the positive lens group, a GRIN lens component having the shape of a lens and refractive indices lowered as the portions thereof are farther from the optical axis in the direction perpendicular to the optical axis so that the GRIN lens component produces Petzval's sum having a value the negative side as compared with the Petzval's s produced by a homogenous lens component. This means minimizes the Petzval's sum having a large positive value which is produced by the positive lens group.

Further, by using, in the positive lens group, a GRIN lens component having the shape of a negative lens and such a refractive index distribution as to lower refractive index as the lens portions are farther from the optical axis in the direction perpendicular to the optical axis, it is possible to cancel the distortion produced by the other lens group (negative lens group) with the negative distortion produced by the surface of the GRIN lens component. This design makes it possible to favorably correct the distortion at the wide position which has been described as the defect of a zoom lens system comprising two lens groups like the zoom lens system according to the present invention.

Now, description will be made on significance of the above-mentioned conditions.

When refractive index at a radial distance of y is represented by n(y), refractive index distribution of a radial GRIN lens component is given by the following formula:

$$n(y) = N_0 + N_1 y^2 + N_2 y^4 + \ldots$$

wherein the reference symbol $N_0$ represents refractive index on the optical axis, and the reference symbols $N_1$, $N_2$, ... designate the coefficients of the second order, the fourth order, ... of refractive index distribution.

The refractive power of this radial GRIN lens component is a sum of the refractive power of the surface thereof and refractive power of the medium thereof. Out of these refractive powers, the refractive power of the medium $\phi_G$ is expressed as $\phi_G = -2N_1 t$ when lens thickness is represented by t. From the view point of practical lens shaping, the lens thickness t cannot have so large a value. If the upper limit of the condition (1) is exceeded, refractive power of medium $\phi_G$ will be weakened, the burden of refractive power to be shared by the lens surface will be too heavy for obtaining the desired refractive power and the lens surface will produce aberrations too remarkable for correction. Especially at the tele position, distortion will be produced remarkably and cannot be corrected. If the lower limit of the condition (1) is exceeded, in contrast, the aberrations produced by medium will be too remarkable for correction. Especially at the tele position, spherical aberration will be overcorrected.

By designing the above-mentioned GRIN lens component so as to have the shape of a negative meniscus lens, the present invention favorably corrects not only the distortion at the wide position but also the spherical aberration and coma at the tele position which are apt to be overcorrected.

Further, in case of the zoom lens system comprising a positive front lens group and a negative rear lens group which are arranged in the order from the object side, it is desirable to design it so as to satisfy the condition (2) as already described. If the upper limit of the condition (2) is exceeded, coma will be aggravated at the wide position. If the lower limit of the condition (2) is exceeded, in contrast, distortion will not be corrected sufficiently.

Furthermore, in the case of the zoom lens system comprising a negative front lens group and a positive rear lens group which are arranged in the order from the object side, it is desirable to design it so as to satisfy the condition (3). If the upper limit of the condition (3) is exceeded, spherical aberration will be overcorrected and, in addition, distortion will also be overcorrected at the wide position. If the lower limit of the condition (3) is exceeded, in contrast, distortion will not be corrected sufficiently.

BRIEF DESCRIPTION OF THE DRAWINGS

FIG. 4 and FIG. 5 show curves illustrating aberration characteristics at the wide position and the tele position respectively of the Embodiment 1;

DETAILED DESCRIPTION OF THE PREFERRED EMBODIMENTS

Figure 1:
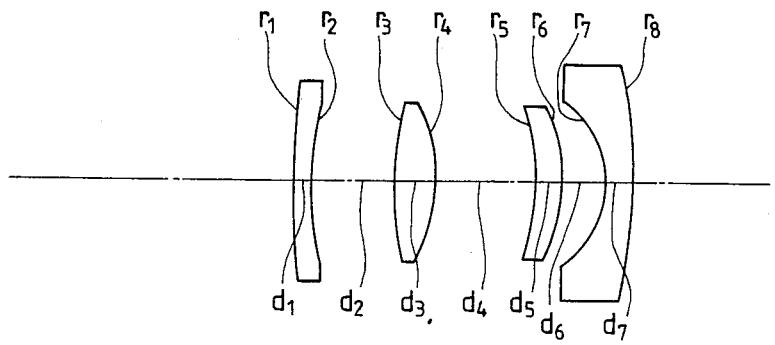
FIG. 1 through FIG. 3 show sectional views illustrating compositions of Embodiments 1 through 3 of the zoom lens system according to the present invention.

Now, the zoom lens system according to the present invention will be detailedly described below with reference to the preferred embodiments having the following numerical data:

| Embodiment 1 | | | |
|---|---|---|---|
| $f = 41.2$ mm~78.5 mm, F/4.6~5.5, $2\omega = 55.3° \sim 30.8°$ | | | |
| $r_1 = 115.019$ | | | |
| | $d_1 = 2.602$ | $n_1$ (GRIN lens) | |
| $r_2 = 47.355$ | | | |
| | $d_2 = 12.141$ | | |
| $r_3 = 49.136$ | | | |
| | $d_3 = 5.790$ | $n_2$ (GRIN lens) | |
| $r_4 = -23.793$ | | | |
| | $d_4 = $ (variable) | | |
| $r_5 = -38.598$ | | | |
| | $d_5 = 4.317$ | $n_3$ (GRIN lens) | |
| $r_6 = -21.592$ | | | |
| | $d_6 = 5.902$ | | |
| $r_7 = -14.143$ | | | |
| | $d_7 = 4.094$ | $n_4 = 1.834$ | $\nu_4 = 42.7$ |

-continued $r_8 = -75.172$

|  | Wide position | Tele position |
|---|---|---|
| $d_4$ | 14.665 | 4.553 |

Data of GRIN lens $n_1(y)_d = 1.80610 - 0.78632 \times 10^{-3} \cdot y^2 + 0.86199 \times 10^{-5} \cdot y^4$ $n_1(y)_g = 1.82787 - 0.76891 \times 10^{-3} \cdot y^2 + 0.89571 \times 10^{-5} \cdot y^4$ $n_2(y)_d = 1.54771 - 0.33561 \times 10^{-3} \cdot y^2 - 0.12398 \times 10^{-5} \cdot y^4$ $n_2(y)_g = 1.55827 - 0.32725 \cdot \times 10^{-3} \cdot y^2 - 0.12306 \times 10^{-5} \cdot y^4$ $n_3(y)_d = 1.85026 + 0.83455 \times 10^{-3} \cdot y^2 + 0.34257 \times 10^{-6} \cdot y^4$ $n_3(y)_g = 1.88070 + 0.86513 \times 10^{-3} \cdot y^2 + 0.77970 \times 10^{-6} \cdot y^4$ $N_{1d} \cdot f_W^2 = -1.33, \quad \dfrac{R_1}{R_2} = 2.43$ Embodiment 2

$f = 41.2 \text{ mm} \sim 68.0 \text{ mm}, \quad F/4.6 \sim 5.6,$
$2\omega = 55.3° \sim 35.2°$ $r_1 = 97.415$
  $d_1 = 2.000 \quad n_1 = 1.72500 \quad \nu_1 = 54.60$
$r_2 = 21.134$ (aspherical surface)
  $d_2 = 5.473$
$r_3 = 24.659$
  $d_3 = 3.847 \quad n_2 = 1.83012 \quad \nu_2 = 33.00$
$r_4 = 36.353$
  $d_4 = $ (variable)
$r_5 = 39.366$
  $d_5 = 6.121 \quad n_3$ (GRIN lens)
$r_6 = -114.509$
  $d_6 = 27.032$
$r_7 = -17.773$
  $d_7 = 3.524 \quad n_4$ (GRIN lens)
$r_8 = -21.498$

|  | Wide position | Tele position |
|---|---|---|
| $d_4$ | 34.28 | 2.65 |

Data of GRIN lens $n_3(y)_d = 1.64000 - 0.10162 \times 10^{-3} \cdot y^2 - 0.52028 \times 10^{-7} \cdot y^4 - 0.55556 \times 10^{-9} \cdot y^6$ $n_3(y)_g = 1.65310 - 0.72435 \times 10^{-4} \cdot y^2 + 0.29461 \times 10^{-7} \cdot y^4 + 0.77148 \times 10^{-10} \cdot y^6$ $n_4(y)_d = 1.83757 - 0.12083 \times 10^{-2} \cdot y^2 + 0.10795 \times 10^{-5} \cdot y^4 + 0.22768 \times 10^{-8} \cdot y^6$ $n_4(y)_g = 1.88279 - 0.12120 \times 10^{-2} \cdot y^2 + 0.10730 \times 10^{-5} \cdot y^4 + 0.22769 \times 10^{-8} \cdot y^6$ Aspherical coefficient
$E = -0.41157 \times 10^{-6}, \quad F = -0.99328 \times 10^{-9}$ $N_{1d} \cdot f_W^2 = -2.05, \quad \dfrac{R_2}{R_1} = 1.21$ Emobidiment 3

$f = 41.2 \text{ mm} \sim 68.0 \text{ mm}, \quad F/4.6 \sim 5.7,$
$2\omega = 55.3° \sim 35.2°$ $r_1 = 107.601$
  $d_1 = 2.000 \quad n_1 = 1.73824 \quad \nu_1 = 54.60$
$r_2 = 21.981$
  $d_2 = 5.474$
$r_3 = 25.333$
  $d_3 = 3.845 \quad n_2 = 1.83002 \quad \nu_2 = 33.00$
$r_4 = 37.768$
  $d_4 = $ (variable)
$r_5 = 36.328$
  $d_5 = 6.908 \quad n_3$ (GRIN lens)
$r_6 = -128.617$
  $d_6 = 26.709$
$r_7 = -16.183$
  $d_7 = 2.769 \quad n_4$ (GRIN lens)
$r_8 = -19.119$

|  | Wide position | Tele positions |
|---|---|---|
| $d_4$ | 34.72 | 3.43 |

Data of GRIN lens $n_3(y)_d = 1.62506 - 0.10392 \times 10^{-3} \cdot y^2 - 0.44458 \times 10^{-7} \cdot y^4 - 0.35320 \times 10^{-9} \cdot y^6$ $n_3(y)_g = 1.63716 - 0.79195 \times 10^{-4} \cdot y^2 + 0.79952 \times 10^{-7} \cdot y^4 - 0.89957 \times 10^{-9} \cdot y^6$ $n_4(y)_d = 1.83757 - 0.13378 \times 10^{-2} \cdot y^2 +$ -continued $\phantom{n_4(y)_g =} 0.14051 \times 10^{-5} \cdot y^4 + 0.32887 \times 10^{-8} \cdot y^6$ $n_4(y)_g = 1.88279 - 0.13392 \times 10^{-2} \cdot y^2 + 0.13198 \times 10^{-5} \cdot y^4 + 0.37192 \times 10^{-8} \cdot y^6$ $N_{1d} \cdot f_W^2 = -2.27, \quad \dfrac{R_2}{R_1} = 1.18$ wherein the reference symbols $r_1, r_2, \ldots$ represent radii of curvature on the surfaces of the respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, and the reference symbols $\nu_1, \nu_2, \ldots$ represent Abbe's numbers of the respective lens components.

The Embodiment 1 is a zoom lens system for compact cameras comprising a very small number of lens components. The Embodiment 1 has the composition shown in FIG. 1 wherein the front lens group consists, in the order from the object side, of a negative meniscus lens component convex on the object side and a biconvex lens component, and has positive refractive power as a whole, and the rear lens group consists of a positive meniscus lens component concave on the object side and a negative meniscus lens component concave on the object side, and has negative refractive power as a whole, and is so adapted as to perform variation of focal length by verying the airspace reserved between these two lens groups. The three lens components arranged on the object side are designed as graded refractive index lens components.

In a zoom lens system consisting, in the order from the object side, of a positive lens group and a negative lens group like the Embodiment 1, positive distortion is produced by the negative lens group. The Embodiment 1 uses, as the first lens component in the positive lens group, i.e., as the lens component arranged on the extremely object side, a GRIN lens component having the shape of a negative meniscus lens and refractive index distribution wherein refractive indices are lowered as the lens portions are farther from the optical axis in the direction perpendicular to the optical axis. This lens component produces distortion which cancels the distortion produced by the negative lens group and therefore serves to correct distortion favorably in the zoom lens system as a whole. Further, coma is corrected favorably at the wide position by arranging the first GRIN lens component in such a direction as to locate the convex surface thereof on the object side. If the concave surface of the first lens component is located on the object side, remarkable coma will be produced on the positive side at the marginal portion at the wide position of the zoom lens system and cannot be corrected.

In the Embodiment 1, not only the first lens component but also the second and third lens components are designed as GRIN lens components. These GRIN lens components serve for correcting the spherical aberration and chromatic aberration which are apt to be overcorrected. However, these aberrations can be corrected by using homogenous lenses when proper glass materials are selected.

In order to compose a zoom lens system having perfomance on the order similar to that of the Embodiment 1, it will be required to use seven or eight lens components. In contrast, the Embodiment 1 consists of a very small number of, i.e., four lens components.

Figure 2:
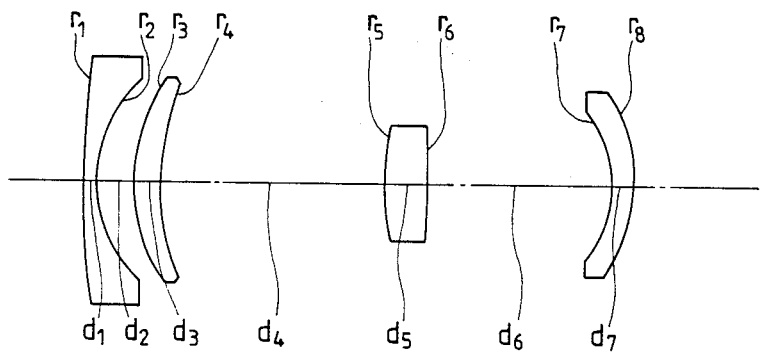
Figure 3:
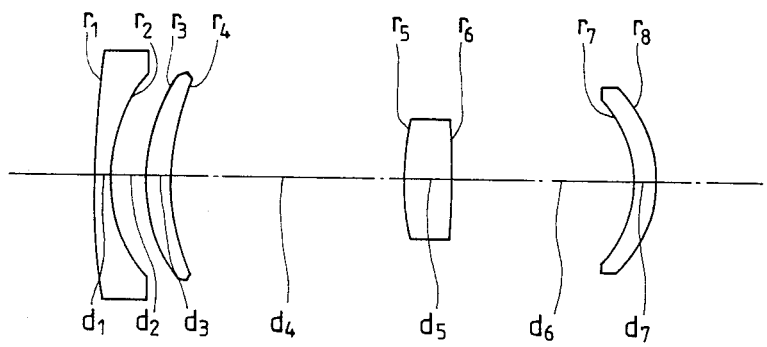
Figure 6:
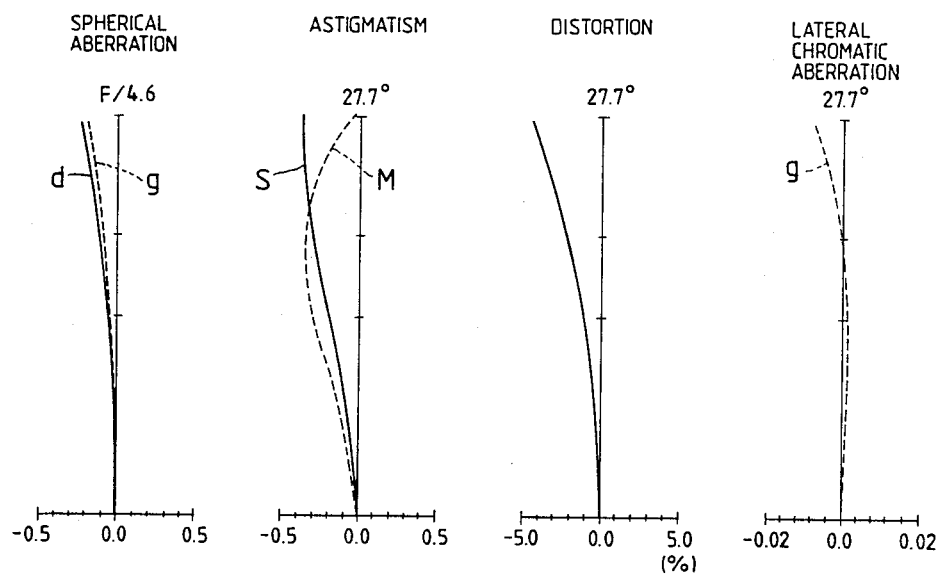
FIG. 6 and FIG. 7 show curves illustrating aberration characteristics at the wide position and the tele position respectively of the Embodiment 2.
Figure 7:
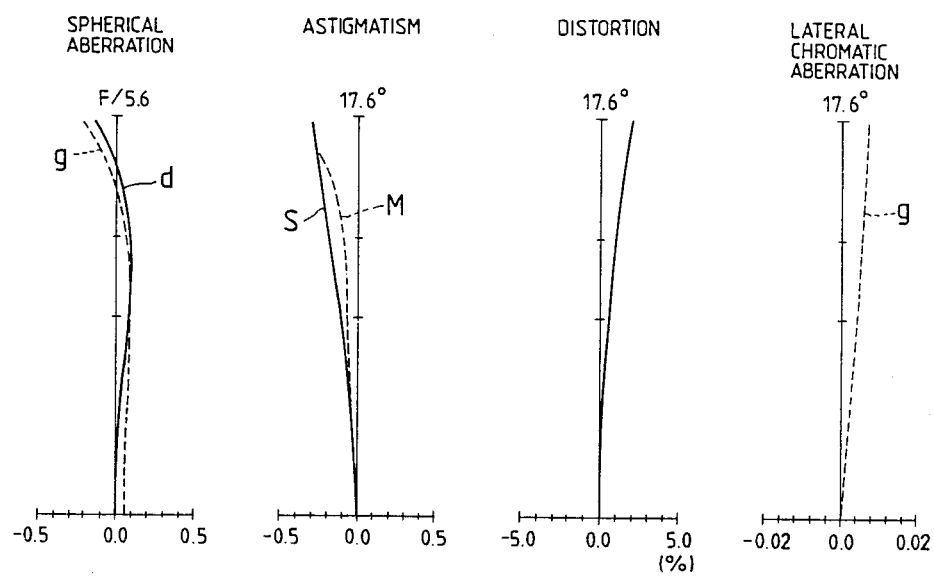
Figure 8:
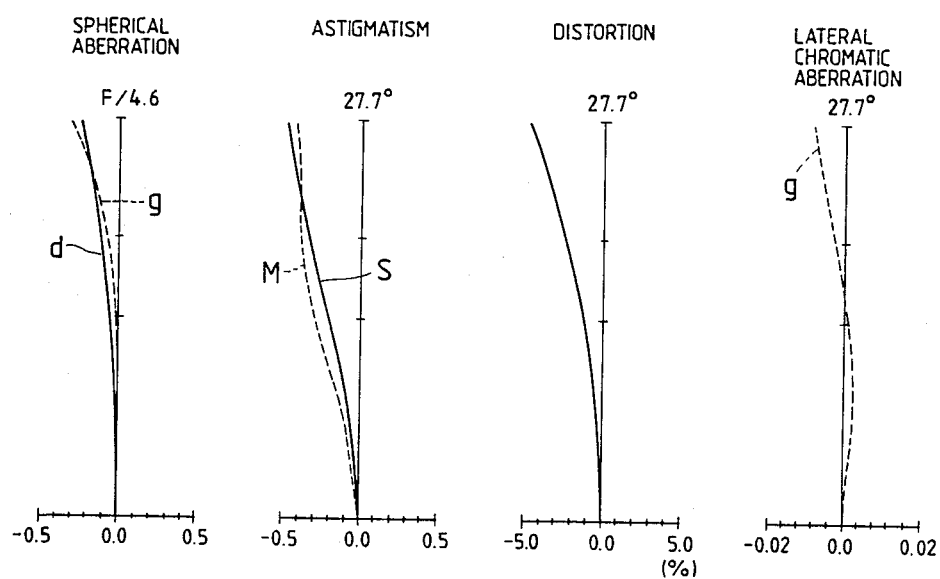
FIG. 8 and FIG. 9 show curves illustrating aberration characteristics at the wide position and the tele position respectively of the Embodiment 3.
Figure 9:
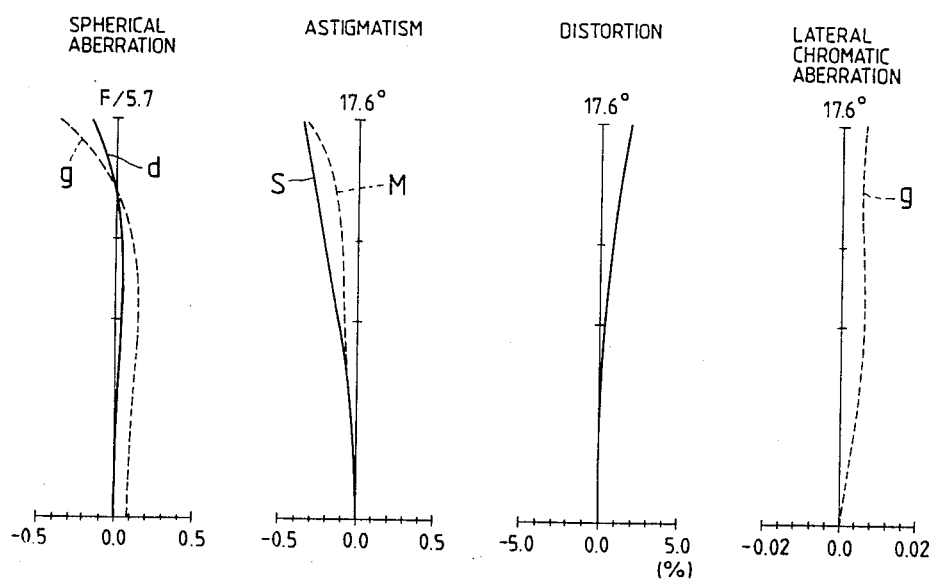

The Embodiments 2 and 3 are zoom lens systems for single lens reflex cameras consisting of a very small number of lens components. These Embodiments have the compositions shown in FIG. 2 and FIG. 3 respectively, i.e., comprise a front lens group consisting, in the order from the object side, of a negative meniscus lens component convex on the object side and a positive meniscus lens component convex on on the object side, and having negative refractive power, and a rear lens group consisting of a positive lens component and a negative meniscus lens component concave on the object side, and having positive refractive power as a whole, and is so adapted as to perform variation of focal length by varying the airspace reserved between these two lens groups.

In the Embodiments 2 and 3, the two lens components constituting the lens group having positive refractive power (the third and the fourth lens components) are designed as GRIN lens components. A zoom lens system consisting, in the order from the object side, of a negative lens group and a positive lens group like the Embodiment 2 or 3 has a defect that negative distortion is produced by the negative lens group. In the Embodiments 2 and 3, however, distortion is corrected favorably in the entire zoom lens systems by cancelling the distortion produced by the negative lens group with the distortion produced by the GRIN lens component which is adopted as the image side lens component in the positive lens group, has the shape of a negative meniscus lens and is designed so as to have a refractive index distribution wherein refractive indices are lowered as the lens portions are farther from the optical axis in the direction perpendicular to the optical axis.

In the Embodiments 2 and 3, positive refractive power is imparted to said GRIN lens component so that it shares the positive refractive power of the lens group having the positive refractive power. However, the lens surface has a negative Petzval's sum to minimize the Petzval's sum of the positive lens group which is large on the positive side. Not only the distortion which is overcorrected at the tele position but also curvature of field and coma are corrected favorably by arranging the image side lens component in the positive lens group (the fourth lens component) designed as the GRIN lens component in such a direction as to locate the convex surface thereof on the image side. Further, the object side lens component in the positive lens group (the third lens component) is designed as a GRIN lens component in the Embodiments 2 and 3. Spherical aberration and chromatic aberration are corrected mainly by this lens component.

If a zoom lens system like the Embodiment 2 or 3 is composed only of homogeneous lens components, it will be required to use four to six lens components to compose the rear lens group. In contrast, each of the Embodiments 2 and 3 comprises the positive lens group (rear lens group) consisting only of two lens components, consists of a very small number of, i.e., four lens components in total and has favorably corrected aberrations.

In addition, the Embodiment 2 uses an aspherical surface. When the direction along the optical axis is taken as the x axis, height of ray is taken as the y axis and radius of curvature on the vertex of the aspherical surface is represented by r, shape of the aspherical surface is expressed by the following formula:

$$x = y^2/\{r + r\sqrt{1 - (y/r)^2}\} + Ey^4 + Fy^6 + \ldots$$

wherein the reference symbols E, F, ... represent the coefficients of aspherical surface.

As is understood from the foregoing description, the zoom lens system according to the present invention consists of a very small number of lens components and have favorably corrected aberrations.

I claim:

1. A zoom lens system comprising a lens group having positive refractive power and another lens group having negative refractive power, and so adapted as to perform variation of focal length by varying the airspace reserved between said lens groups, said lens group having the positive refractive power comprising at least one graded refractive index lens component having the shape of a negative meniscus lens and a refractive index distribution wherein refractive indices are lowered as the lens portions are farther from the optical axis in the direction perpendicular to the optical axis and, when the refractive index distribution of said graded refractive index lens is given by the following formula, said zoom lens system satisfying the following condition (1):

$$n(y)_d = N_{0d} + N_{1d}y^2 + N_{2d}y^4 + \ldots$$

$$-12 < N_{1d}f_w^2 < -0.5 \tag{1}$$

wherein the reference symbol y represents distance from the optical axis in the direction perpendicular to the optical axis, the reference symbol $n(y)_d$ designates refractive index for the d-line at the distance y, the reference symbol $N_{0d}$ denotes refractive index for the d-line on the optical axis, the reference symbol $N_{1d}$, $N_{2d}$, ... represent the coefficients of refractive index distribution for the d-line, and the reference symbol $f_W$ designates focal length of the zoom lens system as a whole at the wide position thereof.

2. A zoom lens system according to claim 1 comprising, in the order from the object side, a lens group having positive refractive power and another lens group having negative refractive power, comprising said graded refractive index lens component having the shape of a negative meniscus lens arranged in such a direction as to locate the convex surface thereof on the object side, and so designed as to satisfy the following condition (2):

$$1 < \frac{R_1}{R_2} < 6 \tag{2}$$

wherein the reference symbols $R_1$ and $R_2$ represent radii of curvature on the object side surface and the image side surface respectively of said graded refractive index lens component.

3. A zoom lens system according to claim 2 wherein said lens group having the positive refractive power comprising a negative meniscus lens component convex on the object side and a biconvex lens component, and said lens group having the negative refractive power comprising a positive meniscus lens component concave on the object side and a negative meniscus lens component concave on the object side.

4. A zoom lens system according to claim 1 comprising, in the order from the object side, a lens group having negative refractive power and another lens group having positive refractive power, comprising said graded refractive index lens component having the shape of a negative meniscus lens arranged in such a direction as to locate the convex surface thereof on the image side, and so designed as to satisfy the following condition (3):

$$1 < \frac{R_2}{R_1} < 6 \tag{3}$$

wherein the reference symbols $R_1$ and $R_2$ represent radii of curvature on the object side surface and the image side surface respectively of said graded refractive index lens component.

5. A zoom lens system according to claim 4 wherein said lens group having the negative refractive power comprising a negative meniscus lens component convex on the object side and a positive meniscus lens component convex on the object side, and said lens group having the positive refractive power comprising a positive lens component and a negative meniscus lens component concave on the object side.

6. A zoom lens system comprising, in the order from the object side, a negative lens group consisting of a negative lens component and a positive lens component, and a positive lens group consisting of a positive lens component and a meniscus lens component convex on the image side, said zoom lens system being arranged to be zoomed by varying the space between said positive lens group and said negative lens group.

* * * * *